United States Patent
Persikov et al.

(10) Patent No.: US 9,400,682 B2
(45) Date of Patent: Jul. 26, 2016

(54) RANKING AND SCHEDULING OF MONITORING TASKS

(71) Applicant: Hewlett-Packard Development Company, L.P., Houston, TX (US)

(72) Inventors: Sergey Persikov, Rishon LeZion (IL); Barak Yeshoua, Hadera (IL); Rotem Steuer, Modiin (IL); Rudy Medarov, Ramla (IL); Atali Levi, Holon (IL); Ira Cohen, Modiin (IL); Ohad Assulin, Neve llan (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 192 days.

(21) Appl. No.: 13/706,847

(22) Filed: Dec. 6, 2012

(65) Prior Publication Data

US 2014/0165070 A1    Jun. 12, 2014

(51) Int. Cl.
*G06F 9/46* (2006.01)
*G06F 9/48* (2006.01)
*G06F 11/30* (2006.01)

(52) U.S. Cl.
CPC .......... *G06F 9/4881* (2013.01); *G06F 11/3096* (2013.01)

(58) Field of Classification Search
CPC ............... G06F 9/4881; G06F 9/4843
USPC .......................................................... 718/103
See application file for complete search history.

(56) References Cited

U.S. PATENT DOCUMENTS

| 5,437,032 A * | 7/1995 | Wolf et al. ...................... 718/103 |
| 7,877,686 B2 | 1/2011 | Abbott et al. |
| 8,082,545 B2 | 12/2011 | Prakash |
| 2003/0191795 A1* | 10/2003 | Bernardin et al. ............. 709/105 |
| 2008/0222640 A1* | 9/2008 | Daly et al. ..................... 718/103 |
| 2009/0183162 A1* | 7/2009 | Kindel et al. .................. 718/103 |
| 2009/0320032 A1* | 12/2009 | Avni et al. ...................... 718/103 |
| 2012/0151396 A1 | 6/2012 | S et al. |
| 2012/0192195 A1* | 7/2012 | El-Moursy ............ G06F 9/4893 718/103 |
| 2014/0068620 A1* | 3/2014 | Factor ................... G06F 9/5027 718/102 |

OTHER PUBLICATIONS

Nimsoft., Unified Monitoring Portal—Customizable. Intuitive Monitoring Views that Deliver Powerful Insights, Data Sheet, Mar. 28, 2011, 4 pages.

(Continued)

*Primary Examiner* — Emerson Puente
*Assistant Examiner* — Steven Do
(74) *Attorney, Agent, or Firm* — Brooks, Cameron & Huebsch, PLLC (57) ABSTRACT

Systems, methods, and machine-readable and executable instructions are provided for dynamically ranking and scheduling monitoring tasks. Dynamically ranking and scheduling monitoring tasks can include determining an updated ranking for each of a number of monitoring tasks, where the updated ranking can include analyzing historical measurements of each of the number of monitoring tasks. An order of execution can be scheduled for each of the number of monitoring tasks based on the updated ranking for each of the number of monitoring tasks.

20 Claims, 3 Drawing Sheets

(56) References Cited

OTHER PUBLICATIONS

Yang, et al., "A Multi-task Real-time Scheduling Algorithm Based on Dynamic Weight Compensation and Adaptive Task Jumping," 2009 International Conference on Networking and Digital Society, May 30-31, 2009, pp. 229-232.

Nimsoft., "Unified Management Portal," Retrieved from http://www.nimsoft.com/solutions/nimsoft-unified-manager/unified-management-portal.html, Oct. 1, 2012, 2 pages.

* cited by examiner

RANKING AND SCHEDULING OF MONITORING TASKS

BACKGROUND

System and application monitoring represents a large part of information technology management. Performance and availability measurements collected with monitoring tools are used to recognize problems that may affect business services. Due to resource constraints, applications may have to choose which monitoring tasks to execute and which to postpone.

DETAILED DESCRIPTION

Monitoring of various components and applications within an information technology (IT) environment may provide system administrators with valuable data. Monitoring can be accomplished by system monitors, which can be hardware or software, that perform monitoring tasks to collect data. Data returned by monitoring tasks can include, among other things, information such as central processing unit (CPU) usage and/or frequency, an amount of free random access memory (RAM), free space on one or more hard drives, temperature of the CPU, networking information (e.g., a system Internet Protocol (IP) address and/or current rates of upload and download), date and time, system uptime, computer name, username, hard drive self-monitoring, analysis and reporting technology (SMART) data, fan speeds, voltages being provided by the power supply, etc.

The data returned by monitoring tasks can be used to recognize problems within a system. In the context of business services, recognition of problems within an IT environment may allow system administrators to proactively address problems before they result in negative effects on a critical application or component, thereby helping to maintain operational readiness.

However, system monitoring may represent a significant cost. A monitoring tool may compete for limited application and/or hosting server resources.

Monitoring capacity may be increased by scale up or scale out. Scaling up, or scaling vertically, may include adding resources to a node in the system (e.g., adding CPUs or memory to a computer). Scaling out, or scaling horizontally, may include adding more nodes to a system (e.g., adding a new computer to a distributed software application). However, up or out scaling by adding resources to an IT environment may raise IT costs and/or management overhead. Alternatively, increasing efficiency of monitoring tools can be accomplished through increased management of monitoring tasks. Increased management of monitoring tasks may include manual adjustment of monitoring task scheduling by IT administrators and IT organizations which may be costly and/or complex.

Systems, methods, and machine-readable and executable instructions are provided for dynamically ranking and scheduling monitoring tasks. Dynamically ranking and scheduling monitoring tasks can include continually determining an updated ranking for each of a number of monitoring tasks, where the updated ranking can include analyzing historical measurements of each of the number of monitoring tasks. An order of execution can be scheduled for each of the number of monitoring tasks based on the updated ranking of each of the number of monitoring tasks.

By adaptively updating the ranking based on historical measurements of the monitoring tasks and scheduling accordingly, applications could manage load bursts without impacting monitoring quality and therefore increase monitoring capacity through more efficient use of application and/or hosting server resources. Unlike some systems that statically assign monitoring tasks for execution in first-in/first-out order, adaptively updating a ranking can permit detection of threshold changes and/or data variability, and monitor such changes and/or variability through dynamically adjusting monitoring task priority.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

As used herein, "a" or "a number of" an element and/or feature can refer to one or more of such elements and/or features. Further, where appropriate, as used herein, "for example" and "by way of example" should be understood as abbreviations for "by way of example and not by way of limitation".

Figure 1:
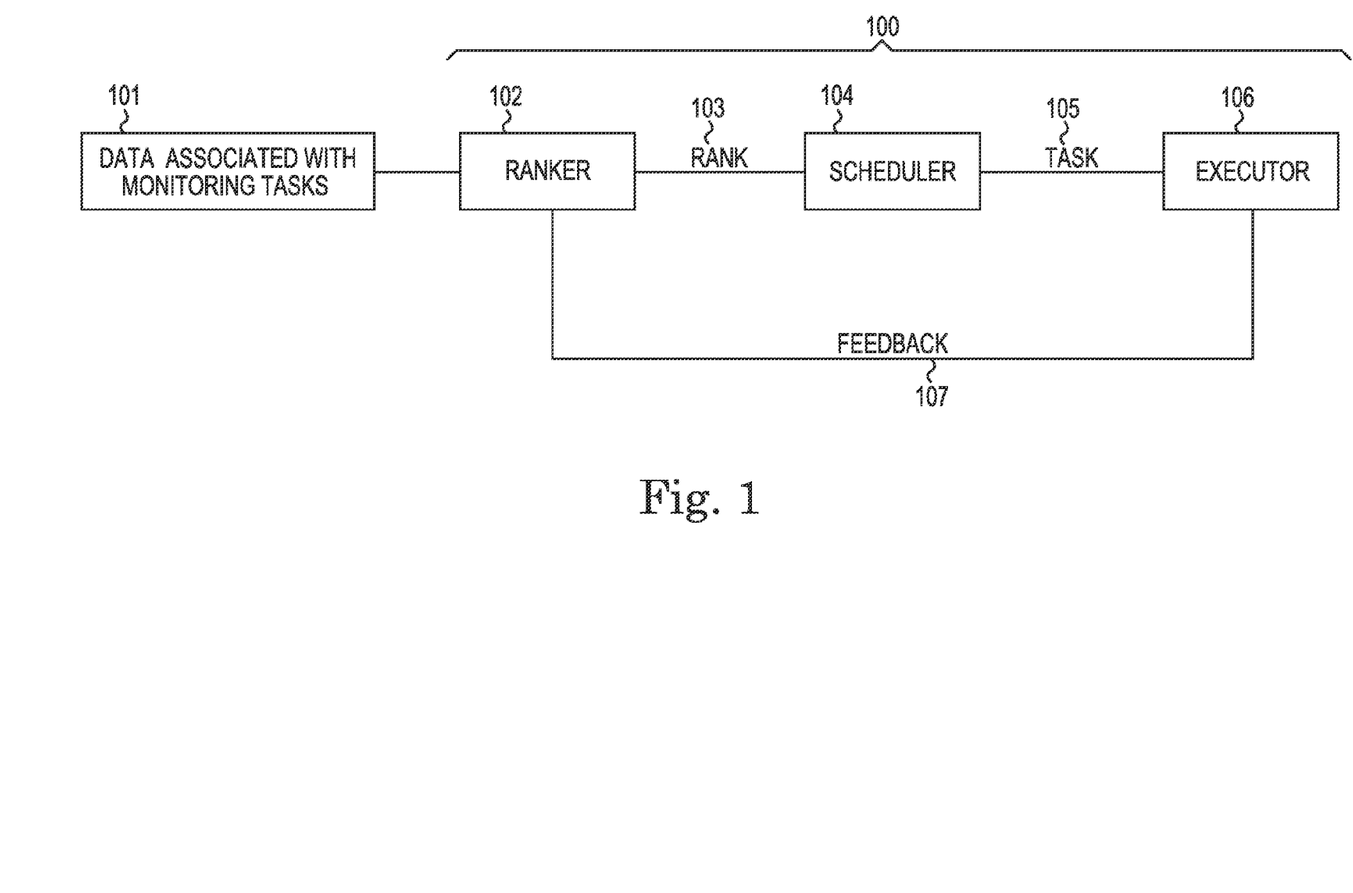
FIG. 1 illustrates a flow chart of an example system for ranking and scheduling of monitoring tasks according to the present disclosure.

FIG. 1 illustrates a sequence diagram depicting the ranking and scheduling of monitoring tasks according to an example. FIG. 1 depicts a system which can include a ranker 102, a scheduler 104, and an executor 106. The ranker 102, scheduler 104, and executor 106 can be a combination of hardware and program instructions designed to implement their respective functions. The hardware can include a processor and memory while the program instructions are the code stored on the memory and executable by the processor to implement the respective functions. The system 100 can include software (e.g., machine readable instructions, etc.) that can direct a processor to perform a number of functions. The software can be stored on a machine readable medium (MRM) and can be executed by the processor to perform the number of functions.

Data associated with monitoring tasks 101 can be received as an input to system 100 by a ranker 102. The data can be received from any number of sources, which can not be limited to monitors performing the monitoring tasks, data storage containing data associated with monitoring tasks, a scheduler 104, and/or an executor 106 communicating data associated with monitoring tasks as feedback 107. As described herein, the ranker 102 can manipulate the data 101 in various fashions, as described herein, in order to accomplish its functions. For example, the ranker 102 can perform mathematical operations on the data (e.g., 101) it receives.

The ranker 102 can determine an updated rank 103 for each of a number of monitoring tasks. The number of monitoring tasks can be any monitoring tasks (e.g., all monitoring tasks performed in a system, any subset of monitoring tasks performed in a system, etc.). Updating the rank can occur with any frequency (e.g., every time a monitoring task is executed, only some of the time a monitoring task is executed, periodically, continuously, etc.) The updated rank 103 can represent an update to an initial ranking. For example, an initial ranking can be assigned based on expected data variability of a monitoring resource type. This expected data variability can be predetermined. For example, data variability can be predicted by associating a predicted amount of variability with a particular system or application that is being monitored within the IT environment. For example, CPU usage measurements for a particular monitoring resource can be expected to exhibit high variability, whereas disk space usage measurement for a particular monitoring resource can be expected to exhibit low variability The updated rank 103 determined by the ranker 102 can be based on analyzing historical measurements of each of the number of monitoring tasks. Analysis of the historical measurements can, for example, include analysis of a measurement of variability in the historical measurements of monitoring tasks. Alternatively or in addition, analysis of the historical measurements can include analysis of the historical execution of the monitoring task, such as its prior ranking. Alternatively or in addition, analysis of the historical measurements can include analysis of a threshold crossing probability of data returned by a monitoring task where, for example, a threshold can indicate a potential issue in the system being monitored, which can result in an alert to an operator. For example, the analysis of historical measurements can include all three of the analyses of the variability of measurements historically, the historical execution, and the threshold crossing probability.

Analysis of the historical measurements by the ranker 102 can result in a score for a monitoring task, which can provide a basis for the updated rank 103 determination for that monitoring task. The score can be assigned to each monitoring task based on weighted historical measurements of each of the monitoring tasks. The weighted historical measurements can include, for example, measures of variability. For example, the measures of variability can include entropy and/or entropy calculations of the monitoring task measurements. That is, for example, a measure of the uncertainty associated with the measured data (e.g., the randomness of the measured data). Entropy can be calculated by:

$$H(X) = -\sum_{i=1}^{n} p(x_i) \log_b p(x_i)$$

where H is the entropy measurement of the information source symbolized by the discrete random variable X with n outcomes $\{x_i : i=1, \ldots, n\}$. In this equation, n is a number of symbols that the information source can provide and b is a base of the logarithm used (e.g., values of b can be 2, Euler's number e, and 10 corresponding to the units of entropy bit, nat, and dit, respectively, among others). $p(x_i)$ can be the probability mass function of outcome $x_i$. The measures of variability can alternatively or additionally include, for example, measures and/or calculations of variance of the historical measurements of each monitoring task. Variance, or how far the set of measurements returned by a monitoring task is spread out, is a descriptor of a probability distribution which can be calculated by:

$$\text{Var}(X) = \sum_{i=0}^{n} \rho_i \cdot (x_i - \mu)^2$$

where Var is the variance measurement of the information source symbolized by the discrete random variable X with probability mass function $x_1 \to \rho_1, \ldots, x_n \to \rho_n$. $\mu$ is the expected value, which can be calculated by:

$$\mu = \sum_{i=0}^{n} \rho_i \cdot x_i$$

where when such a discrete weighted variance is specified by weights whose sum is not 1, one can divide by the sum of the weights. The measures of variability can alternatively or additionally include, in some examples, measures and/or calculations of predictability of the measurements of each monitoring task based on historical measurements. For example, measurements of predictability can be based on time series analysis of the historical measurements of the monitoring tasks. In some examples, this can include comparing measurements from monitoring tasks to future predicted values based on previously observed values in a time series applied to a model. The model can be an autoregressive model where linear prediction formulas attempt to predict the output of a system based on previous outputs. Such an autoregressive model (AR(p)) can be expressed as $$Y_t = \alpha_0 + \alpha_1 Y_{t-1} + \alpha_2 Y_{t-2} + \ldots + \alpha_p Y_{t-p} + \epsilon_t$$

where $\alpha_1, \ldots, \alpha_p$ are the parameters of the model, $\alpha_0$ is a constant (often omitted for simplicity), and $\epsilon_t$ is the source of randomness (white noise) and can be assumed to have the following characteristics:

$E[\epsilon_t] = 0$ $E[\epsilon_t^2] = \sigma^2$ $E[\epsilon_t \epsilon_s] = 0$ for all $t \neq s$.

Additionally, the weighted historical measurements can include measurements of historical execution of the monitoring tasks. Measures of the historical execution of a monitoring task can include, for example, an anti-starvation calculation regarding the historical execution of monitoring tasks. In such calculations, the time a monitoring task will run can be calculated based on a weighted average of the previous estimates and measured values of the monitoring task (e.g., historical time a monitoring task spent waiting for execution (e.g., in an execution queue), historical run time, and/or historical instances of being outrun by other monitoring tasks, among other measurements). Anti-starvation calculations can serve to gradually increase a priority of a task based on its waiting time (e.g., with more delay, a given monitoring task can be assigned a higher priority). Other measurements of historical execution of the monitoring tasks can alternatively or additionally include measurements of task execution time (e.g., a measurement of average time of resource usage for the task). In some examples, the priority of a particular task can be inversely correlated to the duration of resource usage for that task. In some examples, measurements of historical execution of monitoring tasks can include the prior ranking of a monitoring task or tasks. In such examples, a monitoring task receiving a higher ranking can subsequently receive a lower ranking to avoid starvation of other monitoring tasks.

The weighted historical measurements for each of the monitoring tasks can include measurements of a threshold crossing probability. The threshold can be a predetermined value or range of values that indicates a potential issue in the system being monitored which can be dealt with by an alert to an operator. Threshold crossing probability can, for example, be a calculation of the proximity of a measurement for a monitoring task to at least one predetermined threshold for each monitoring task. For example, predetermined thresholds for usage of a CPU monitored by a particular monitoring task can be 10% or lower, which can indicate a low load in a "warning" category, can be 10.01%-79.99% indicating an acceptable load in a "good" category, and can be 80% or greater indicating a high load in an "error" category. If a most current measurement returned by a monitoring task is 50% CPU usage, the monitoring task can be calculated to be 80%-50%=30% away from the "error" threshold and 50%-10.01%=39.99% away from the warning threshold. Threshold crossing probability can alternatively or additionally include a calculation of a change in proximity of a subsequent measurement for a monitoring task to at least one predetermined threshold in relation to a preceding measurement of the monitoring task in relation to at least one predetermined threshold (e.g., whether measurements returned by monitoring tasks are approaching or moving away from predetermined thresholds). For instance, in the example given above with a 50% CPU usage, if on its next iteration a monitoring task monitoring the same CPU returns a measurement of 70% CPU usage, then the monitoring task could be calculated to be 80%-70%=10% away from the "error" threshold and 70%-10.01%=59.99% away from the warning threshold and 59.99%-39.99%=20% CPU usage closer to the "error" threshold and further away from the "warning" threshold.

Historical measurements can be weighted in all the above outlined instances, where each particular measure is weighted to determine a value of the measure for ranking in the particular system. While a default value for such weights can be setting the weights equal for all measures, the historical measurements can be assigned weights according to particular characteristics of a system or directions of a system administrator. The weighting can also be normalized, for instance to be between 0-1. Each monitoring task can then be assigned a score based on the weighted historical measurements. An updated ranking can be determined based on the score. For example, monitoring tasks with higher scores can be determined to have a higher priority. In some examples, the score can be based on combining a plurality of the above outlined weighted measures for a particular monitoring task. For example, the score can be based on the weighted average of weighted measures (e.g., entropy, variance, predictability, anti-starvation calculation, execution time, and threshold crossing probability, among others), where each measure gets a weight between 0-1, and the measure is normalized to be between 0-1 as well. The resulting score can influence the priority of the monitoring task ranking. For example, a score where monitoring tasks have a value closer to 1 can indicate that the monitoring tasks have a higher priority. Monitoring tasks with a higher priority can receive a higher updated ranking corresponding to an earlier time of execution for the particular monitoring task.

The ranker 102 can update the scheduler 104 with the updated rank 103 for the monitoring task. The ranker 102 can communicate the updated rank 103 to the scheduler 104 as an instruction that the scheduler 104 can execute to prioritize the monitoring tasks for execution. For instance, the ranker 102 can communicate the updated rank 103 for a monitoring task as a score that the scheduler 104 can utilize in its prioritization of an execution queue.

The scheduler 104 can schedule an order of execution for each of the monitoring tasks based on the updated rank 103 for each of the respective monitoring tasks. Scheduling based on the updated rank 103 can include prioritizing monitoring tasks 105 based on historical measurements. For example, scheduling can include reprioritizing tasks that received a higher priority updated ranking. The higher priority updated ranking can, in some examples, be a result of historical data that, when analyzed, indicates a potential issue with a system and/or application being monitored. In some examples, scheduling can be reprioritizing certain monitoring tasks for execution after other monitoring tasks that have being persistently delayed over a period of time.

A monitoring task 105 receiving an updated rank 103 higher than another monitoring task can be scheduled for execution before the lower ranked monitoring task. In other instances, a monitoring task receiving an updated rank 103 higher than one monitoring task, but lower than another, can be scheduled for execution before the lower ranked monitoring task, but after the higher ranked monitoring task. As outlined in greater detail herein, the updated rank 103 can be based on analyzing historical measurements of each of the number of monitoring tasks. Monitoring tasks can be scheduled according to the updated rankings based on, for example, scores comprising a weighted average where each historical measure has a weight between 0-1, and the measure (e.g., variance) is normalized to between 0-1 as well. As such, monitoring tasks scoring closer to 1 can have a higher priority. Therefore, monitoring tasks with scores closer to 1 will be determined to have a higher rank and can be scheduled to be executed before monitoring tasks with lesser scores. Scheduling can include sending each of the number of monitoring tasks to an executor 106 and placing the tasks into an execution queue of the executor 106 in a manner such that they do not collide in time and are executed according to the updated ranking.

The executor 106 can execute each monitoring task 105 based on the order of execution scheduled by scheduler 104. Executing the monitoring task can include carrying out instructions triggering sequences of actions producing the effect of performing the monitoring tasks. In some examples, execution can include executing tasks from an execution queue. For example, monitoring tasks can be executed sequentially from an execution queue. In some examples, execution can include executing tasks in an order specified by instructions sent by the scheduler 104 and received by the executor 106.

The executor 106 can also collect data associated with execution of the monitoring tasks 105. For example, executor 106 can collect data useful in calculations forming the basis of updated rankings as outlined in greater detail herein. The data can include, for example, data returned by the monitoring tasks and metrics of the execution of the monitoring tasks, among other examples.

In some examples, executing the monitoring tasks can include providing feedback 107 on the execution of each of the number of monitoring tasks 105 as historical data. The executor 106 can send feedback 107 to any of the other components (e.g., the ranker 102, the scheduler 104, etc.). The feedback 107 can include, for example, data associated with monitoring tasks collected by the executor 106 (e.g., measurements returned by the monitoring tasks and metrics of execution of the monitoring tasks). For example, the executor 106 can send such feedback 107 to the ranker 102.

The feedback 107 can be received by, for example, the ranker 102. The ranker 102 can compile the feedback 107 and utilize the feedback 107 as historical data in determining the updated ranking of associated monitoring tasks.

Figure 2:
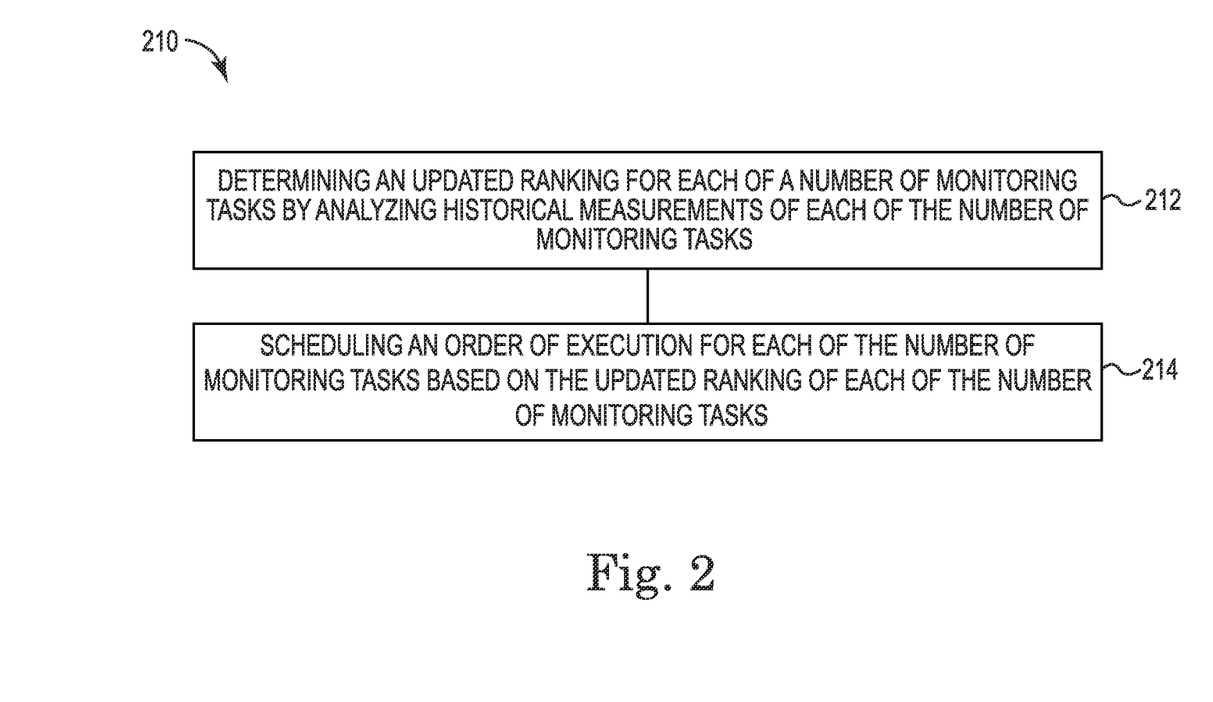
FIG. 2 illustrates a block diagram of an example method for ranking and scheduling of monitoring tasks according to the present disclosure.

FIG. 2 illustrates a block diagram of an example method 210 for ranking and scheduling of monitoring tasks according to the present disclosure. Unless explicitly stated, the method examples described herein are not constrained to a particular order or sequence. Additionally, some of the described method examples, or elements thereof, can be performed at the same, or substantially the same, point in time. As described herein, the actions, functions, calculations, data manipulations, and or storage, etc., can be performed by execution of non-transitory machine-readable instructions stored in a number of memories (e.g., software, firmware, and/or hardware, etc.) of a number of applications, as described herein.

At 212 an updated ranking of each of a number of monitoring tasks is determined. Determining the updated ranking includes analyzing historical measurements of each of the number of monitoring tasks to calculate the updated ranking. In some examples, determining the updated ranking can be performed at any time and/or continually for monitoring tasks and/or subsets of monitoring tasks.

At 214 an order of execution is scheduled for each of the number of monitoring tasks based on the updated ranking for each of the number of monitoring tasks. Therefore, the updated ranking determined at 212 can provide the basis for scheduling the order of execution at 214.

As discussed in greater detail with regard to FIG. 1, analysis of the historical measurements in 212 can include, for example, analysis of the variability of measurements, analysis of the historical execution of the monitoring task, analysis of a threshold crossing probability of data returned by a monitoring task, or analysis of all three. For example, a series of monitoring tasks (e.g., monitoring CPU usage on a computing asset (Task A), monitoring free space on a hard drive of a computing resource (Task B), and/or monitoring the amount of free RAM on a computing resource (Task C) among them can have an initial ranking (e.g., Task A-Rank 1, Task B-Rank 2, Task C-Rank 3). Analysis of the historical measurements can demonstrate that, while Tasks A and B are returning measurements with expected variability, have been executed in a timely manner, and return measurements that demonstrate stable measurements within a predetermined threshold, Task C is returning unexpectedly variable measurements, has been underperformed and outrun by Tasks A and B, and/or is returning measurements indicative of the measurements crossing a predetermined threshold. In such an example, an updated ranking (e.g., Task A-Rank 2, Task B-Rank 3, Task C-Rank 1) can be determined.

As described in greater detail with regard to FIG. 1, the updated ranking can be based on a score for a monitoring task. The score can be assigned to each monitoring task based on weighted historical measurements of each of the monitoring tasks. Weighting the historical measurements used in these calculations can result in measurements that have a tendency to indicate a potential issue having a greater influence on the score the monitoring task receives.

The weighted historical measurements can include, for example, measures of variability as discussed in greater detail with regard to FIG. 1. As an example, the measures of variability can include entropy of the monitoring task measurements. For example, a monitoring task can receive a higher score if it demonstrates higher entropy, therefore resulting in a higher updated ranking and earlier execution. The measures of variability can also include, for example, measures of variance of the historical measurements of each monitoring task. For example, a monitoring task can receive a higher score if it demonstrates higher variability, therefore resulting in a higher updated ranking and earlier execution. The measures of variability can include, in some examples, measures of predictability of the measurements of each monitoring task based on historical measurements. For example, a monitoring task can receive a higher score if it demonstrates a lower amount of predictability in its measurements, resulting in a higher ranking and earlier execution. The weighting can also be normalized, for example, to be between 0-1.

Additionally, the weighted historical measurements can include measurements of historical execution of the monitoring tasks as discussed in greater detail with regard to FIG. 1. Measures of the historical execution of a monitoring task can include, for example, an anti-starvation calculation regarding the historical execution of monitoring tasks. For example, a monitoring task that was previously executed with a longer delay relative to other monitoring tasks or previous executions of the same or similar monitoring tasks can receive a higher score resulting in a higher updated ranking and earlier execution. Other measurements of historical execution of the monitoring tasks can include measurements of task execution time. For example, if a monitoring task historically ran for a longer period of time relative to other monitoring tasks, it can receive a lower score, resulting in a lower update ranking and later execution.

The weighted historical measurements of each of the monitoring tasks can include measurements of a threshold crossing probability as discussed in greater detail with regard to FIG. 1. For example, a monitoring task that returns data indicative of an increased threshold crossing probability can receive a higher score resulting in a higher updated ranking and earlier execution. Additionally, if a monitoring task returns data indicating a first reading within two thresholds and a second reading closer to a threshold by a small magnitude relative to the first reading, it can receive a neutral score resulting in an unchanged updated ranking and execution time. However, the same monitoring task can return data indicating a third reading closer to a threshold by a large magnitude relative to the first and second measurements. Such a monitoring task can receive a higher score resulting in an increased updated ranking and earlier execution time.

As described in greater detail with regard to FIG. 1, the score can be based on combining a plurality of the above outlined weighted measures for a particular monitoring task. For example, the score can be based on the weighted average, where each measure gets a normalized weight between 0-1, where the measure (e.g., variance) is normalized to be between 0-1 as well. The resulting score can influence the priority of the monitoring task ranking. For example, a score where monitoring tasks have a value closer to 1 can indicate that the monitoring tasks have a higher priority. Monitoring tasks with a higher priority can receive a higher updated ranking corresponding to an earlier time of execution for the particular monitoring task.

As described in greater detail with regard to FIG. 1, the tasks can be scheduled for execution according to the updated ranking of a given monitoring task relative to the updated ranking of other monitoring tasks. As such, monitoring tasks can be dynamically (e.g., continually, periodically, etc.) scheduled in a manner allowing for adaptive monitoring of the IT environment while conserving IT environment resources.

Figure 3:
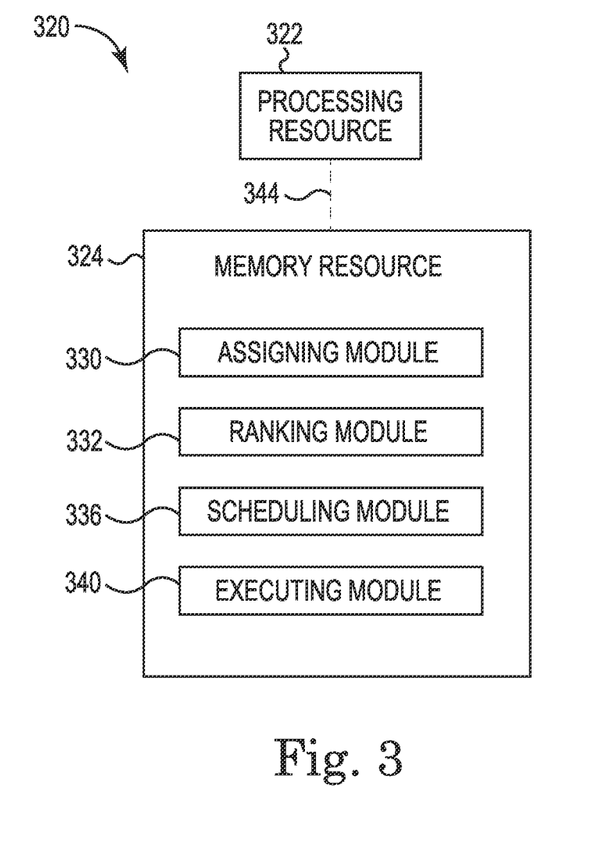
FIG. 3 illustrates a block diagram of an example ranking and scheduling system according to the present disclosure.

FIG. 3 illustrates a block diagram of an example ranking and scheduling system 320 according to the present disclosure. The system 320 can utilize software, hardware, firmware, and/or logic to perform a number of functions (e.g., determine an updated ranking for each of a number of monitoring tasks by analyzing historical measurements of each of the number of monitoring tasks, etc.).

The system 320 can be any combination of hardware and program instructions configured to perform the number of functions. The hardware, for example, can include a processing resource 322. Processing resource 322 may represent any number of processors capable of executing instructions stored by a memory resource (e.g., memory resource 324, machine readable medium, etc.). Processing resource 322 may be integrated in a single device or distributed across devices. The hardware, for example, can alternatively or additionally include a memory resource 324. Memory resource 324 can represent generally any number of memory components capable of storing program instructions (e.g., machine readable instructions (MRI), etc.) that can be executed by processing resource 322. Memory resource 324 can include non-transitory computer readable media. Memory resource 324 may be integrated in a single device or distributed across devices. Further, memory resource 324 may be fully or partially integrated in the same device as processing resource 322 or it may be separate but accessible to that device and processing resource 322. System 320 may be implemented on a user or client device, on a server device or collection of server devices, or on a combination of the user device and the server device or devices.

In one example, the program instructions can be part of an installation package that when installed can be executed by processing resource 322 to implement system 320. In this example, memory resource 324 can be a portable medium such as a CD, DVD, or flash drive or a memory maintained by a server from which the installation package can be downloaded and installed. In another example, the program instructions may be part of an application or applications already installed. Here, memory resource 324 can include integrated memory such as a hard drive, solid state drive, or other integrated memory devices.

The program instructions (e.g., machine-readable instructions (MRI)) can include a number of modules (e.g., 330, 332, 336, and 340) that include MRI executable by the processing resource 322 to execute an intended function (e.g., assign an initial ranking, determine an updated ranking, scheduling an order of execution, execute each of the number of monitoring tasks based on the order of execution, etc.). Each module (e.g., 330, 332, 336, and 340) can be a sub-module of other modules. For example, an assigning module 330 and scheduling module 336 can be sub-modules and/or contained within the ranking module 332. In another example, the number of modules 330, 332, 336, and 340 can comprise individual modules on separate and distinct computing devices.

An assigning module 330 can include MRI that when executed by the processing resource 322 can, for example, assign an initial ranking for each of the number of monitoring tasks. The assigning module can include MRI that when executed by the processing resource 322 assigns an initial ranking based on the predetermined expected data variability of a monitoring resource type. Resource types with greater predicted variability can, for example, receive an initial ranking higher than resource types predicted to have lower variability.

A ranking module 332 can include MRI that when executed by the processing resource 322 can, for example, receive data associated with monitoring tasks. The ranking module 332 can include MRI that when executed by the processing resource 322 manipulates the data in various fashions described herein in order to accomplish various functions. For example, the MRI of ranking module 332 can include instructions to perform mathematical operations on the received data.

Using the data associated with monitoring tasks ranking module 332 can include MRI that when executed by the processing resource 322 can determine an updated ranking for each monitoring task. The updated rankings can be, for example, based on a score including analysis of historical measurements for each of the monitoring tasks. For example, analysis of measures of variability (e.g., measures of entropy of the historical monitoring task measurements, measures of variance of the historical monitoring task measurements, and/or measures of predictability of the measurements) of a monitoring task based on historical measurements can form the basis of the updated ranking as discussed in greater detail with regard to FIGS. 1 and 2.

In addition, the basis of the updated ranking can be analysis of historical measures of execution of a monitoring task including, for example, anti-starvation calculations and task execution time measurements as discussed in greater detail with regard to FIGS. 1 and 2. Further examples include the basis of the updated ranking being analysis of measures of threshold crossing probability including calculations of distance to a threshold or distance toward a threshold from a previous measurement as discussed in greater detail with regard to FIGS. 1 and 2. Ranking module 332 can include MRI that when executed by the processing resource 322 can base updated rankings on a single score for a monitor determined by calculating the weighted average, where each measure gets a weight between 0-1, and the measure (e.g., variance) is normalized to be between 0-1, as discussed in greater detail with regard to FIGS. 1 and 2. The ranking module 322 can further include MRI to update a schedule. Updating a schedule can include providing the scheduler with updated rankings associated with each monitoring task.

Scheduling module 336 can include MRI that when executed by the processing resource 322 can schedule an order of execution for each of the number of monitoring tasks based on the updated ranking. Scheduling can include dynamically setting a delay for lower prioritized monitors. A delay can be accomplished by specifying arrangement of monitoring tasks within an execution queue. Scheduling module 336 can include MRI that when executed by the processing resource 322 can send each of the number of monitoring tasks to an execution queue. For example, monitoring tasks with a higher priority can be placed in an execution queue ahead of those monitoring tasks which have a lower priority. As a result, the higher priority tasks can be accomplished before the lower priority tasks. Scheduling based on updated rankings is discussed in greater detail with regard to FIGS. 1 and 2.

Executing module 340 can include MRI that when executed by the processing resource 322 can perform execution of the scheduled monitoring tasks. Execution of the monitoring tasks can be based on the order of execution determined through execution of the MRI included in scheduling module 336, for example. Executing module 340 can include MRI that when executed by the processing resource 322 can collect data associated with execution of the monitoring tasks. For example, data used in calculations forming the basis of updated rankings as outlined in greater detail with regard to FIG. 1 can be collected. This data can include, for example, data returned by the monitoring tasks and metrics of the execution of the monitoring tasks, among other data. Executing module 340 can include MRI that when executed by the processing resource 322 can provide feedback on execution of each of the number of monitoring tasks. The feedback can include data associated with monitoring tasks collected by executing module 340. The feedback can be compiled and used as historical data, for example, for use in updated ranking determinations.

The memory resource 324, as described herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), etc., as well as other types of machine-readable media.

The memory resource 324 can be integral and/or communicatively coupled to a computing device in a wired and/or a wireless manner. For example, the memory resource 324 can be an internal memory, a portable memory, a portable disk, and/or a memory associated with another computing resource (e.g., enabling MRIs to be transferred and/or executed across a network such as the Internet).

The memory resource 324 can be in communication with the processing resource 322 via a communication path 344. The communication path 344 can be local or remote to a machine (e.g., a computer) associated with the processing resource 322. Examples of a local communication path 344 can include an electronic bus internal to a machine (e.g., a computer) where the memory resource 324 is one of volatile, non-volatile, fixed, and/or removable storage medium in communication with the processing resource 322 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 344 can be such that the memory resource 324 is remote from the processing resource 322 such as in a network connection between the memory resource 324 and the processing resources (e.g., 322). That is, the communication path 344 can be a network connection. Examples of such a network connection can include a local area network (LAN), a wide area network (WAN), a personal area network (PAN), and the Internet, among others. In such examples, the memory resource 324 can be associated with a first computing device and a processor of the processing resource 322 can be associated with a second computing device (e.g., a Java® server). For example, a processing resource 322 can be in communication with a memory resource 324, where the memory resource 324 includes a set of MRI and where the processing resource 322 is designed to carry out the set of MRI.

As used herein, "logic" is an alternative and/or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

It is to be understood that the descriptions presented herein have been made in an illustrative manner and not a restrictive manner. Although specific examples for systems, methods, computing devices, and instructions have been illustrated and described herein, other equivalent component arrangements, instructions, and/or device logic can be substituted for the specific examples presented herein without departing from the spirit and scope of the present disclosure.

What is claimed:

1. A method for adaptively ranking and scheduling a plurality of monitoring tasks, comprising:
    utilizing a processing resource to execute instructions stored on a non-transitory medium to:
    analyze historical measurements from execution of the plurality of monitoring tasks in a single execution queue, wherein to analyze includes to determine an increase in starvation indicators for each of the plurality of monitoring tasks in the single execution queue, wherein the starvation indicators include a first quantity of instances of a first monitoring task of the number of monitoring tasks in the single execution queue being outrun by a second monitoring task of the plurality of monitoring tasks in the single execution queue;
    determine an updated ranking for each of the plurality of monitoring tasks within the single execution queue based on the analysis of the historical measurements, wherein to determine includes to increase a ranking of the first monitoring task when the first quantity of instances of the first monitoring task in the single execution queue being outrun by the second monitoring task in the single execution queue is greater than a previous quantity of instances, and wherein to determine includes to decrease a ranking of a third monitoring task of the plurality of monitoring tasks in the single execution queue when the third monitoring task has historically ran for a longer period of time relative to a fourth monitoring task of the plurality of monitoring tasks in the single execution queue; and
    schedule an order of execution for each of the plurality of monitoring tasks in the single execution queue based on the updated ranking for each of the plurality of monitoring tasks.

2. The method of claim 1, wherein utilizing comprises utilizing the processing resource to execute each of the plurality of monitoring tasks based on the scheduled order of execution.

3. The method of claim 2, wherein utilizing comprises utilizing the processing resource to provide feedback on execution of each of the plurality of monitoring tasks as historical data.

4. The method of claim 1, wherein analyzing the historical measurements of the plurality of monitoring tasks comprises analyzing a measurement of variability in the historical measurements from execution of each of the plurality of monitoring tasks.

5. The method of claim 4, wherein analyzing the measurement of variability comprises analyzing at least one of an entropy calculation of the historical measurements from execution of each of the plurality of monitoring tasks, a variance calculation of the historical measurements from execution of each of the plurality of monitoring tasks, and a calculation of predictability of the historical measurements from execution of each of the plurality of monitoring tasks.

6. The method of claim 5, wherein analyzing the calculation of the predictability of the measurements from execution of the plurality of monitoring tasks comprises analyzing a time series of the historical measurements from execution of each of the plurality of monitoring tasks.

7. The method of claim 1, wherein the starvation indicators include a quantity of time that the first monitoring task has spent awaiting execution in an execution queue.

8. The method of claim 1, wherein to determine the updated ranking includes to increase an initial ranking of the first monitoring task proportional to the increase in the starvation indicator for the task.

9. A non-transitory machine-readable medium storing a set of instructions that, when executed, cause a processing resource to:
    analyze historical measurements from execution of the plurality of monitoring tasks in a single execution queue, wherein to analyze includes to determine an increase in starvation indicators for each of the plurality of monitoring tasks in the single execution queue, wherein the starvation indicators include a first quantity of instances of a first monitoring task of the number of monitoring tasks in the single execution queue being outrun by a second monitoring task of the plurality of monitoring tasks in the single execution queue;

determine an updated ranking for each of the plurality of monitoring tasks within the single execution queue based on the analysis of the historical measurements, wherein to determine includes to increase a ranking of the first monitoring task when the first quantity of instances of the first monitoring task in the single execution queue being outrun by the second monitoring task in the single execution queue is greater than a previous quantity of instances, and wherein to determine includes to decrease a ranking of a third monitoring task of the plurality of monitoring tasks in the single execution queue when the third monitoring task has historically ran for a longer period of time relative to a fourth monitoring task of the plurality of monitoring tasks in the single execution queue; and schedule an order of execution for each of the plurality of monitoring tasks in the single execution queue based on the updated ranking for each of the plurality of monitoring tasks.

10. The non-transitory machine-readable medium of claim 9, further comprising instructions executable by the processing resource to execute each of the plurality of monitoring tasks based on the scheduled order of execution.

11. The non-transitory machine-readable medium of claim 10, further comprising instructions executable by the processing resource to provide feedback on execution of each of the plurality of monitoring tasks as historical data.

12. The non-transitory machine-readable medium of claim 9, wherein analyzing the historical measurements of the plurality of monitoring tasks comprises analyzing a measurement of variability in the historical measurements from execution of each of the plurality of monitoring tasks.

13. The non-transitory machine-readable medium of claim 12, wherein analyzing the measurement of variability comprises analyzing at least one of an entropy calculation of the historical measurements from execution of each of the plurality of monitoring tasks, a variance calculation of the historical measurements from execution of each of the plurality of monitoring tasks, and a calculation of predictability of the historical measurements from execution of each of the plurality of monitoring tasks.

14. The non-transitory machine-readable medium of claim 13, wherein analyzing the calculation of the predictability of the measurements from execution of the plurality of monitoring tasks comprises analyzing a time series of the historical measurements from execution of each of the plurality of monitoring tasks.

15. A system for ranking and scheduling a plurality of monitoring tasks, the system comprising a processing resource in communication with a memory resource, wherein the memory resource includes a set of instructions and wherein the processing resource is designed to carry out the set of instructions to:

analyze historical measurements from execution of the plurality of monitoring tasks in a single execution queue, wherein to analyze includes to determine an increase in starvation indicators for each of the plurality of monitoring tasks in the single execution queue, wherein the starvation indicators include a first quantity of instances of a first monitoring task of the number of monitoring tasks in the single execution queue being outrun by a second monitoring task of the plurality of monitoring tasks in the single execution queue;

determine an updated ranking for each of the plurality of monitoring tasks within the single execution queue based on the analysis of the historical measurements, wherein to determine includes to increase a ranking of the first monitoring task when the first quantity of instances of the first monitoring task in the single execution queue being outrun by the second monitoring task in the single execution queue is greater than a previous quantity of instances, and wherein to determine includes to decrease a ranking of a third monitoring task of the plurality of monitoring tasks in the single execution queue when the third monitoring task has historically ran for a longer period of time relative to a fourth monitoring task of the plurality of monitoring tasks in the single execution queue; and schedule an order of execution for each of the plurality of monitoring tasks in the single execution queue based on the updated ranking for each of the plurality of monitoring tasks.

16. The system of claim 15, wherein the processing resource is designed to carry out the set of instructions to execute each of the plurality of monitoring tasks based on the scheduled order of execution.

17. The system of claim 16, wherein the processing resource is designed to carry out the set of instructions to provide feedback on execution of each of the plurality of monitoring tasks as historical data.

18. The system of claim 15, wherein analyzing the historical measurements of the plurality of monitoring tasks comprises analyzing a measurement of variability in the historical measurements from execution of each of the plurality of monitoring tasks.

19. The system of claim 18, wherein analyzing the measurement of variability comprises analyzing at least one of an entropy calculation of the historical measurements from execution of each of the plurality of monitoring tasks, a variance calculation of the historical measurements from execution of each of the plurality of monitoring tasks, and a calculation of predictability of the historical measurements from execution of each of the plurality of monitoring tasks.

20. The system of claim 19, wherein analyzing the calculation of the predictability of the measurements from execution of the plurality of monitoring tasks comprises analyzing a time series of the historical measurements from execution of each of the plurality of monitoring tasks.

* * * * *